(12) United States Patent
Maekawa et al.

(10) Patent No.: US 10,625,478 B2
(45) Date of Patent: Apr. 21, 2020

(54) METHOD OF MANUFACTURING REINFORCEMENT LAYER

(71) Applicant: TOYOTA JIDOSHA KABUSHIKI KAISHA, Toyota-shi, Aichi-ken (JP)

(72) Inventors: Motoki Maekawa, Toyota (JP); Masayoshi Taki, Konan (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 187 days.

(21) Appl. No.: 15/904,494

(22) Filed: Feb. 26, 2018

(65) Prior Publication Data
US 2018/0257321 A1 Sep. 13, 2018

(30) Foreign Application Priority Data
Mar. 13, 2017 (JP) .................. 2017-047342

(51) Int. Cl.
*B29C 70/86* (2006.01)
*B29B 11/16* (2006.01)
(Continued)

(52) U.S. Cl.
CPC .............. *B29C 70/86* (2013.01); *B29B 11/16* (2013.01); *B29C 70/32* (2013.01); *F17C 1/02* (2013.01); *B29C 53/562* (2013.01); *B29K 2995/0063* (2013.01); *B29L 2031/7156* (2013.01); *B29L 2031/7172* (2013.01); *F17C 2201/0109* (2013.01); *F17C 2203/012* (2013.01);
(Continued)

(58) Field of Classification Search
CPC ...... F17C 1/02; F17C 1/04; F17C 1/06; F17C 2201/01–0123; F17C 2201/0109; F17C 2203/0663; F17C 2203/0665; F17C 2203/0668; F17C 2203/067; F17C 2209/2154; F17C 2209/2163; F17C 2209/232; B29L 2031/7156; B29C 53/562; B29C 53/58; B29C 53/582; B29C 53/60; B29C 70/32; B29C 70/86
USPC .......................... 156/184, 185, 187, 188, 195
See application file for complete search history.

(56) References Cited

U.S. PATENT DOCUMENTS

2010/0276434 A1 11/2010 Berger et al.
2012/0024746 A1* 2/2012 Otsubo .................... F17C 13/06
206/524.3
(Continued)

FOREIGN PATENT DOCUMENTS

JP 2010265931 A 11/2010
JP 2016223569 A 12/2016

*Primary Examiner* — Carson Gross
(74) *Attorney, Agent, or Firm* — Dickinson Wright PLLC

(57) ABSTRACT

A method of manufacturing a reinforcement layer comprises a preparatory step of preparing to-be-wound fiber, and a formation step of forming an uncured sheet layer including multiple layers of the to-be-wound fiber stacked on an outer circumferential surface. In the formation step, the to-be-wound fiber is wound on the outer circumferential surface in such a manner that, regarding an outer layer of the uncured sheet layer and an inner layer of the uncured sheet layer closer to the outer circumferential surface than the outer layer and adjacent to the outer layer in a stacking direction of the to-be-wound fiber, two end portions of the outer layer are located between two end portions of the inner layer in an axis direction extending along a center axis of a winding target member.

7 Claims, 21 Drawing Sheets

(51) Int. Cl.
*F17C 1/02* (2006.01)
*B29C 70/32* (2006.01)
*B29L 31/00* (2006.01)
*B29C 53/56* (2006.01)

(52) U.S. Cl.
CPC ............... *F17C 2203/0604* (2013.01); *F17C 2203/067* (2013.01); *F17C 2203/0609* (2013.01); *F17C 2203/0619* (2013.01); *F17C 2203/0624* (2013.01); *F17C 2205/0305* (2013.01); *F17C 2209/2163* (2013.01); *F17C 2209/232* (2013.01); *F17C 2221/012* (2013.01); *F17C 2270/0184* (2013.01)

(56) References Cited

U.S. PATENT DOCUMENTS

2016/0354970 A1 12/2016 Taki
2017/0291352 A1* 10/2017 Ueda .................. B29C 63/0073

* cited by examiner

METHOD OF MANUFACTURING REINFORCEMENT LAYER

CROSS-REFERENCE TO RELATED APPLICATION

The present application claims priority from Japanese application No. 2017-047342 filed on Mar. 13, 2017, the disclosure of which is hereby incorporated in its entirety by reference into this application.

BACKGROUND

Field

This disclosure relates to a technique about a reinforcement layer arranged around a liner.

Related Art

A tank conventionally known includes a liner, and a reinforcement layer made of fiber-reinforced resin arranged around the liner (Japanese Patent Application Publication No. 2010-265931, for example). The reinforcement layer in the conventional technique has multiple layers (sheet layer) stacked by wounding sheet-like fiber on a straight section of the liner.

If the sheet layer is formed by wounding the sheet-like fiber on the straight section of the liner, a level difference resulting from the sheet layer is caused at a boundary between a part with the wound sheet-like fiber (where the sheet-like fiber is arranged) and a part without the wound sheet-like fiber (where the sheet-like fiber is not arranged). In the presence of the level difference at the boundary, when new fiber is wound on the sheet layer so as to cover the boundary, the fiber to be newly wound might be subject to meandering, for example. This causes the risk of reduction in the strength of the tank. Hence, to reduce the level difference, after the sheet-like fiber is wound on the straight section, the wound fiber should be processed at opposite end portions thereof existing at the boundary for forming the sheet layer. Processing the opposite end portions may increase time or cost for manufacturing the sheet layer and the tank. Hence, a technique capable of eliminating the need for processing for reducing a level difference has been desired to be employed in sheet-like fiber wound on a winding target member such as a straight section.

SUMMARY

According to one aspect of this disclosure, a method of manufacturing a reinforcement layer made of fiber-reinforced resin is provided. The reinforcement layer is arranged around a liner forming a body of a tank. The method of manufacturing the reinforcement layer comprises: a preparatory step of preparing to-be-wound fiber as sheet-like fiber impregnated with resin and having one end portion, an opposite end portion, and two lateral portions connecting the one end portion and the opposite end portion, the to-be-wound fiber having a width reduced stepwise or continuously with increasing distance from the one end portion and decreasing distance to the opposite end portion, each of the two lateral portions being located on an inner side in a width direction of the to-be-wound fiber at a position closer to the opposite end portion than a position closer to the one end portion; and a formation step of forming an uncured sheet layer including multiple layers of the to-be-wound fiber stacked on an outer circumferential surface having a cylindrical shape of a winding target member by winding the to-be-wound fiber sequentially in a circumferential direction of the outer circumferential surface in order from the one end portion toward the opposite end portion. In the formation step, the to-be-wound fiber is wound on the outer circumferential surface in such a manner that, regarding an outer layer of the uncured sheet layer and an inner layer of the uncured sheet layer closer to the outer circumferential surface than the outer layer and adjacent to the outer layer in a stacking direction of the to-be-wound fiber, two end portions of the outer layer are located between two end portions of the inner layer in an axis direction extending along a center axis of the winding target member. According to this aspect, the to-be-wound fiber is wound on the outer circumferential surface in such a manner that the two end portions of the outer layer are located between the two end portions of the inner layer in the axis direction. Thus, after the to-be-wound fiber is wound on the winding target member, there arises no need to execute a step of processing the to-be-wound fiber into a shape conforming to an external surface of the liner.

DELAITED DESCRIPTION

A. First Embodiment

Figure 1:
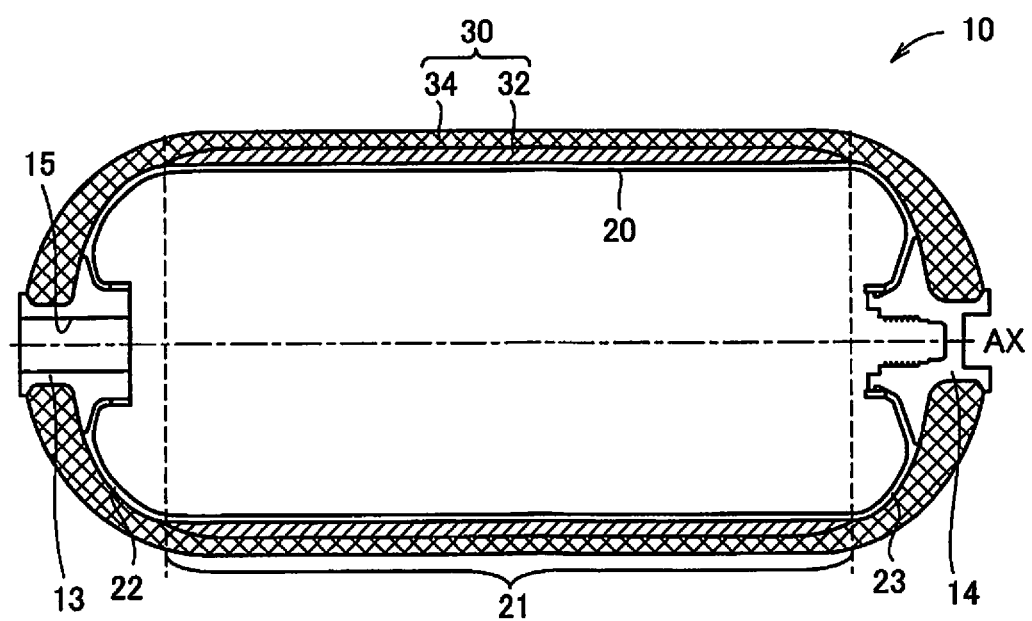
FIG. 1 is a sectional view showing the configuration of a tank in outline manufactured by a manufacturing method of a first embodiment.

FIG. 1 is a sectional view showing the configuration of a tank 10 in outline manufactured by a manufacturing method of a first embodiment of this disclosure. The tank 10 of this embodiment is to store hydrogen gas at high pressure about 70 Mpa, for example. The hydrogen gas stored in the tank 10 is used as fuel gas for a fuel cell installed in a vehicle, for example. The tank 10 includes a liner 20 and a reinforcement layer 30.

The liner 20 is a hollow liner made of resin and forms a body of the tank 10. The liner 20 is made of thermoplastic resin such as polyethylene, nylon, polypropylene, or polyester, for example.

The liner 20 includes a straight section 21, a dome section 22, a dome section 23, a ferrule 13, and a ferrule 14. The straight section 21 has a cylindrical shape. The dome sections 22 and 23 are provided at opposite ends of the straight section 21 and are each formed into a curved plane projecting outwardly from the liner 20. The ferrules 13 and 14 made of metal such as aluminum or stainless steel are provided at tops of the dome sections 22 and 23 respectively. The ferrule 13 has a through hole 15 and is used for taking gas out from the inside of the tank 10 or refilling the inside of the tank 10 with gas. The other ferrule 14 is used for rotating the liner 20 during winding of fiber on the liner 20. The tank 10 may not include the ferrule 14.

The reinforcement layer 30 is a layer arranged around the liner 20. The reinforcement layer 30 is used for reinforcing the liner 20. The reinforcement layer 30 is made of fiber-reinforced resin. The reinforcement layer 30 includes a sheet layer 32 and a helical layer 34.

The sheet layer 32 is formed by stacking multiple turns of sheet-like fiber wound on the external surface of the straight section 21 of the liner 20. The sheet-like fiber of this embodiment is formed by impregnating glass fiber or carbon fiber aligned in one direction with thermosetting resin such as epoxy. In this embodiment, fiber in the sheet-like fiber is aligned in a direction in which the sheet-like fiber is wound, specifically, in the circumferential direction of the straight section 21. The sheet-like fiber may include fiber pointing in a direction crossing the direction in which the sheet-like fiber is wound. The "sheet layer" may also be called a "hoop layer."

The helical layer 34 is formed by winding a fiber bundle by helical winding on the sheet layer 32 and on the dome sections 22 and 23. The fiber bundle of this embodiment is formed by tying 10000 to 40000 glass fibers or carbon fibers in a bundle and impregnating the bundle with thermosetting resin such as epoxy.

The thickness of the sheet layer 32 and that of the helical layer 34 are each set appropriately in a manner that depends on pressure resistance or strength required for the tank 10.

Figure 2:
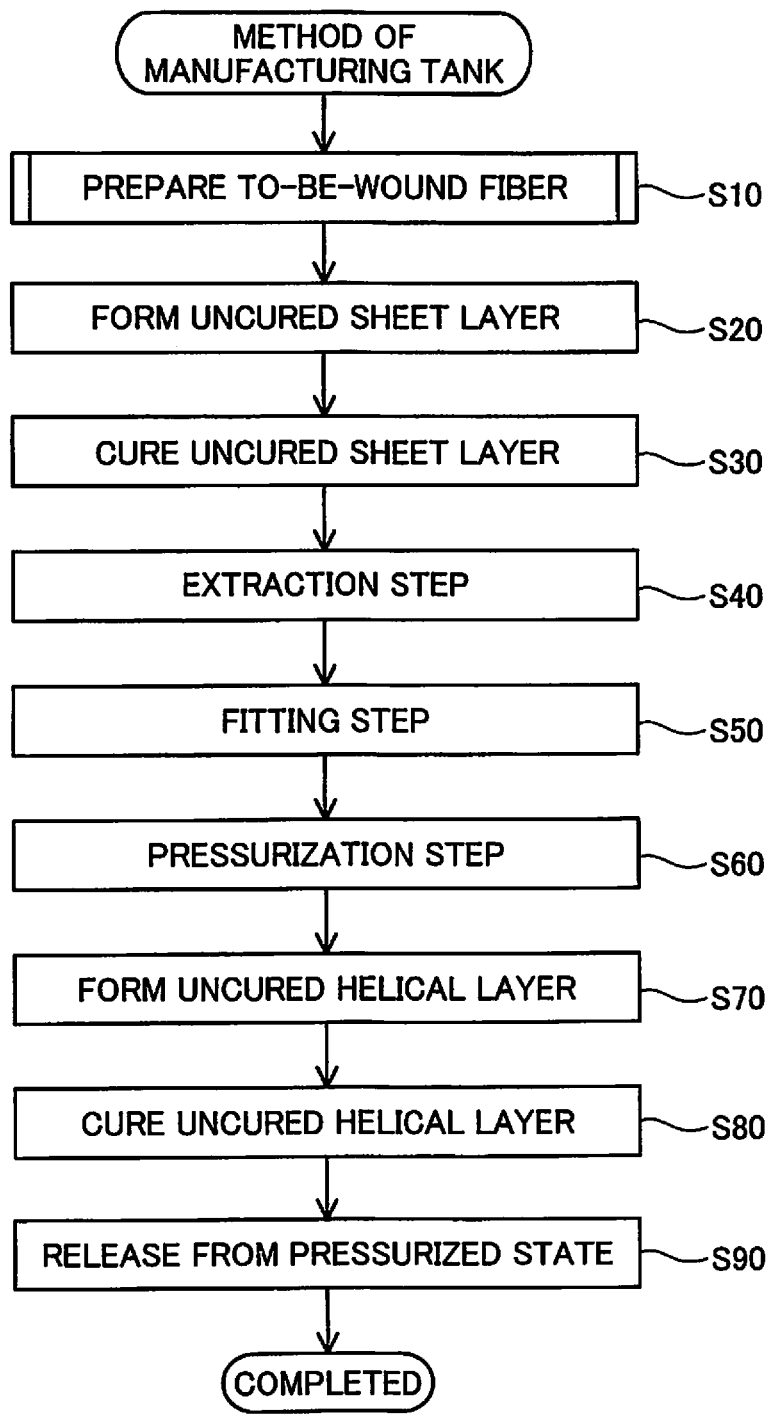
FIG. 2 is a process chart showing the method of manufacturing the tank.
Figure 3:
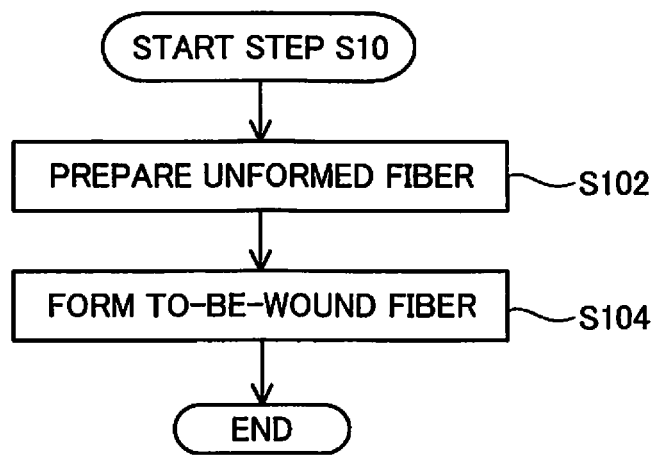
FIG. 3 is a process chart corresponding to step S10.
Figure 4:
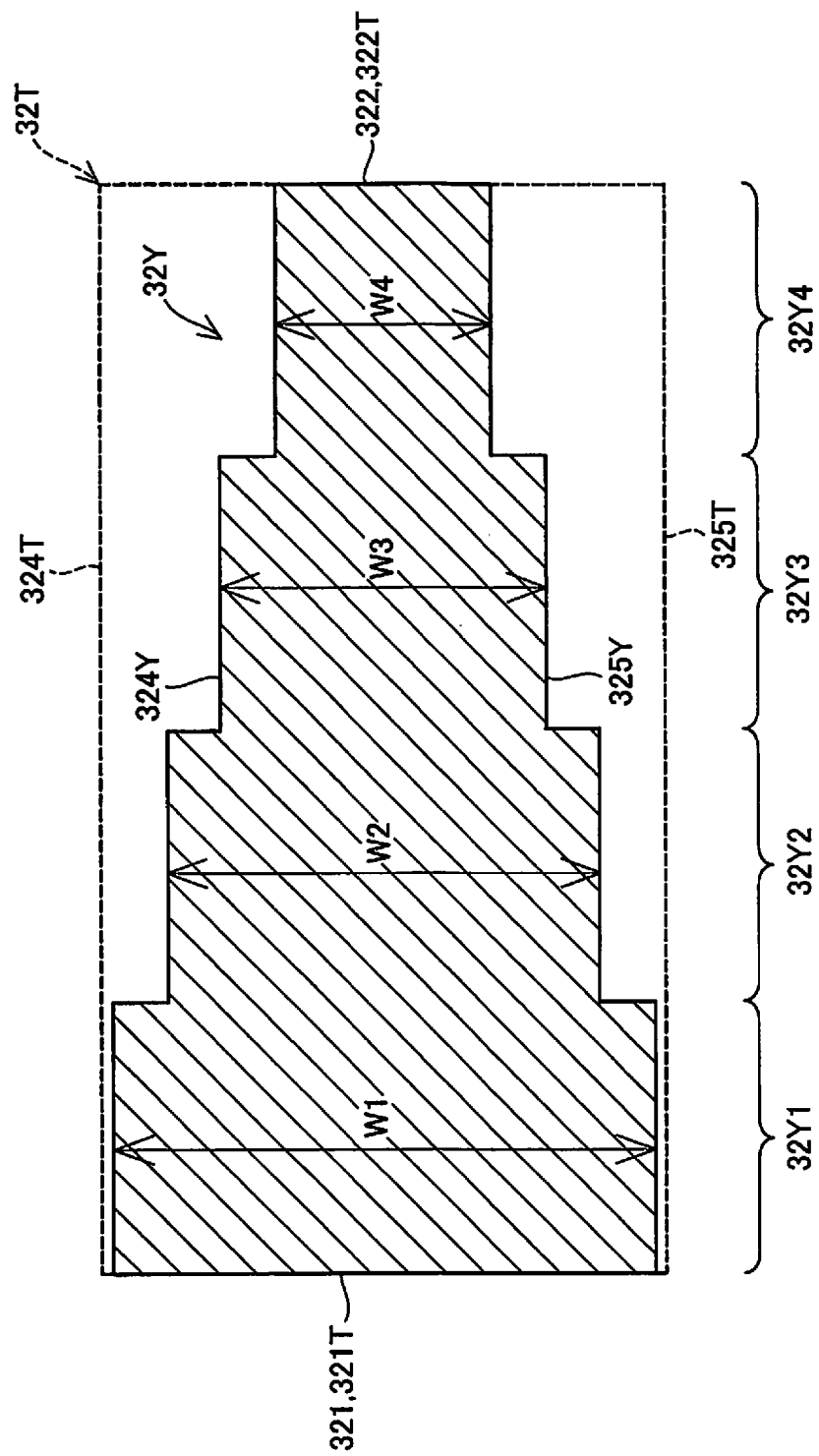
FIG. 4 is a view for explaining step S10.
Figure 5:
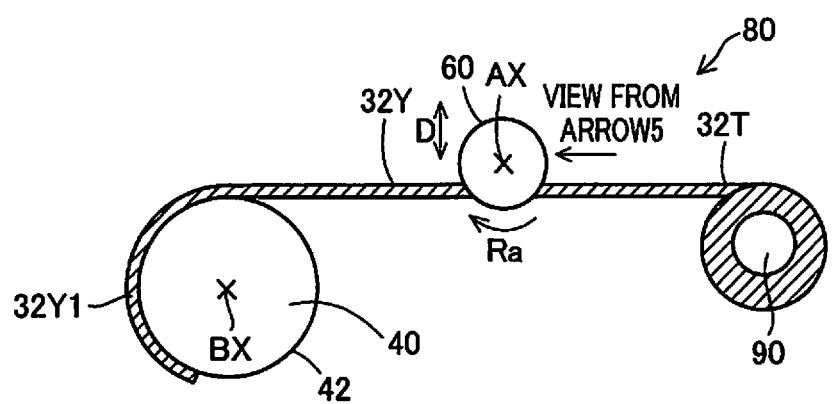
FIG. 5 is a first view for explaining step S10 and step S20.
Figure 6:
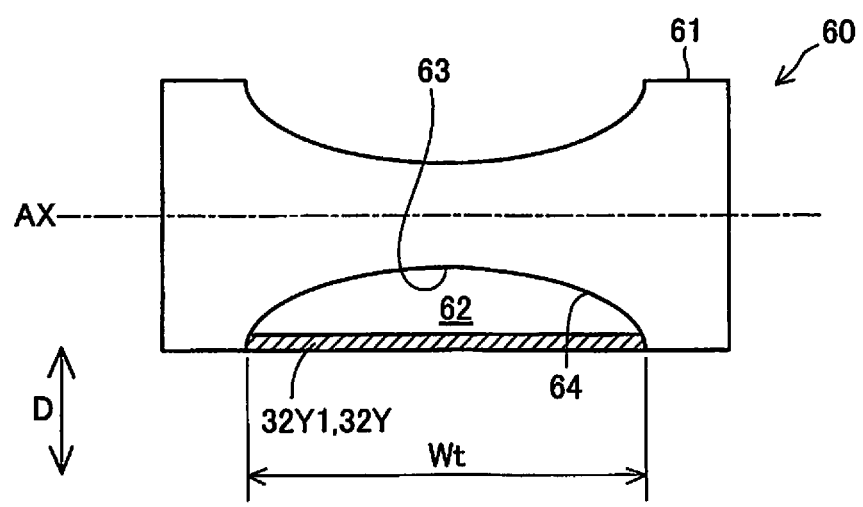
FIG. 6 is a view from an arrow 5 of FIG. 5.
Figure 7:
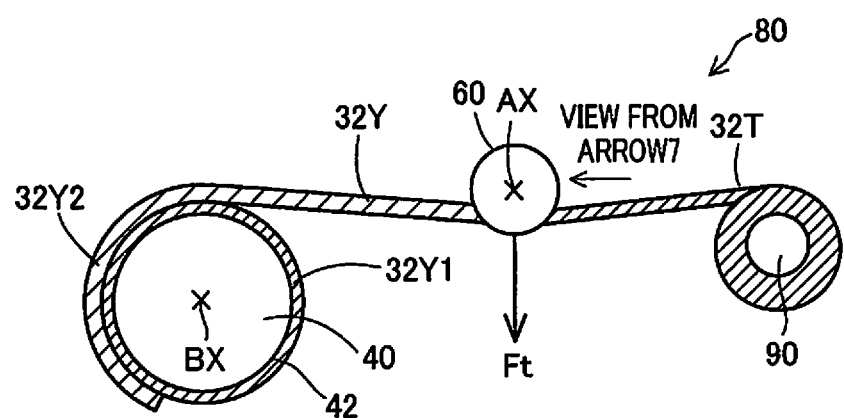
FIG. 7 is a second view for explaining step S10 and step S20.
Figure 8:
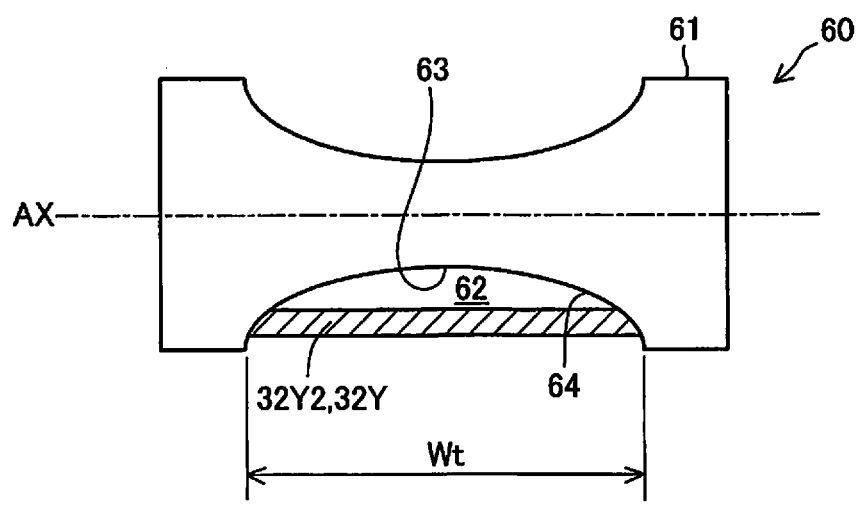
FIG. 8 is a view from an arrow 7 of FIG. 7.
Figure 9:
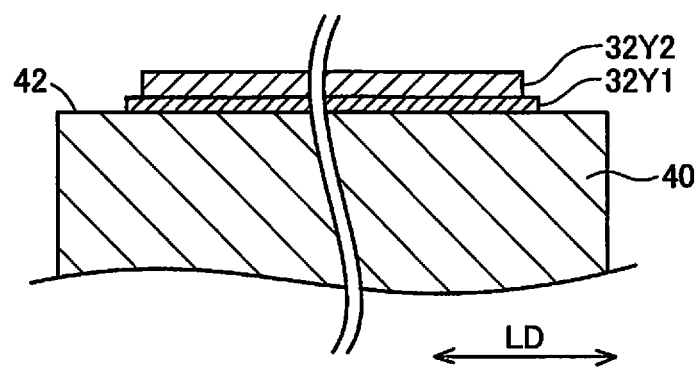
FIG. 9 is a first view for explaining step S20.
Figure 10:
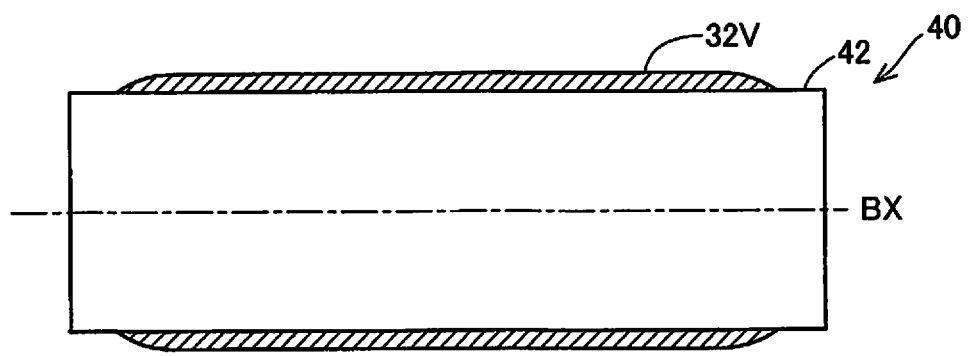
FIG. 10 is a view showing an uncured sheet layer formed on the outer circumferential surface of a mandrel.
Figure 11:
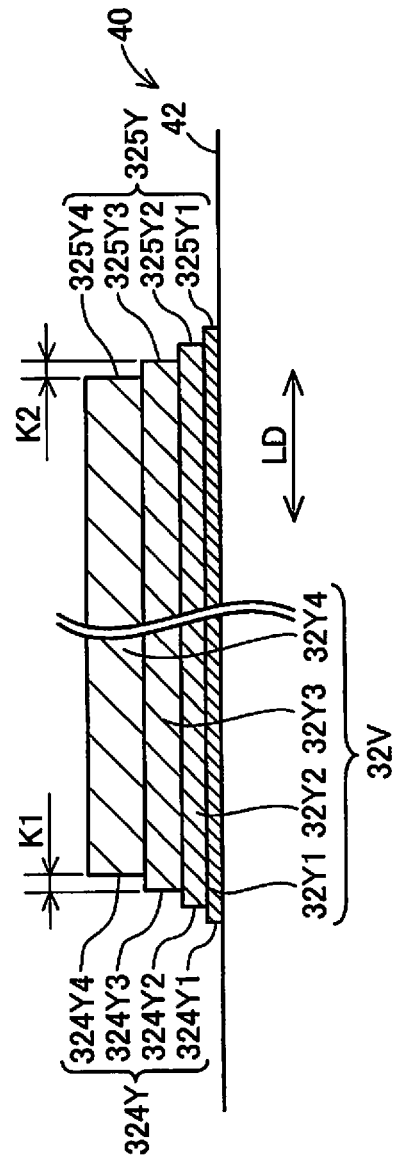
FIG. 11 is a sectional view of the uncured sheet layer formed on the outer circumferential surface of the mandrel.

FIG. 2 is a process chart showing the method of manufacturing the tank 10. FIG. 3 is a process chart corresponding to step S10. FIG. 4 is a view for explaining step S10. FIG. 5 is a first view for explaining step S10 and step S20. FIG. 6 is a view from an arrow 5 of FIG. 5. FIG. 7 is a second view for explaining step S10 and step S20. FIG. 8 is a view from an arrow 7 of FIG. 7. FIG. 9 is a first view for explaining step S20 and is a sectional schematic view of fiber wound on an outer circumferential surface 42 of a mandrel 40. FIG. 10 is a view showing an uncured sheet layer 32V formed on the outer circumferential surface 42. FIG. 11 is a sectional view of the uncured sheet layer 32V formed on the outer circumferential surface 42 of the mandrel 40. FIG. 11 is a sectional view parallel to a center axis BX of the mandrel 40.

In the manufacturing method of this embodiment, sheet-like to-be-wound fiber 32Y is prepared first as shown in FIG. 2 (step S10). Then, the to-be-wound fiber 32Y is wound on the mandrel 40 as a winding target member described later by sheet winding process to form the uncured sheet layer 32V (step S20). In this embodiment, step S20 is executed while step S10 is executed. Step S10 and step S20 will be described in detail below.

As shown in FIG. 3, in step S10, unformed fiber 32T is prepared first (step S102). The unformed fiber 32T (FIG. 4) is sheet-like fiber impregnated with thermosetting resin and has a rectangular shape in a plan view. The unformed fiber 32T has a width slightly larger than a maximum width of a recess 62 of a roller 60 described later, for example. The unformed fiber 32T has a uniform thickness. The unformed fiber 32T is fiber as a basis of the to-be-wound fiber 32Y to be wound on the mandrel 40 (FIG. 5) as a winding target member described later. The unformed fiber 32T has a first end portion 321T corresponding to one end portion, a second end portion 322T corresponding to an opposite end portion, and two lateral portions 324T and 325T connecting the first end portion 321T and the second end portion 322T. The unformed fiber 32T is wound on a bobbin 90 (FIG. 5), for example. A structure other than the bobbin 90 is applicable, as long as such a structure has a mechanism capable of feeding the unformed fiber 32T toward the mandrel 40 while holding the unformed fiber 32T. For example, the bobbin 90 may be replaced by a nip roll.

As shown in FIG. 3, after execution of step S102, the to-be-wound fiber 32Y is formed by using the unformed fiber 32T (step S104). The to-be-wound fiber 32Y is sheet-like fiber impregnated with the thermosetting resin and is used for forming the sheet layer 32. The to-be-wound fiber 32Y (FIG. 4) has one end portion 321, an opposite end portion 322 facing the one end portion 321, and two lateral portions 324Y and 325Y connecting the one end portion 321 and the opposite end portion 322. The two lateral portions 324Y and 325Y form opposite end portions of the to-be-wound fiber 32Y in an axis direction LD (FIG. 9) while the to-be-wound fiber 32Y is wound on the mandrel 40. The axis direction LD is a direction in which the center axis BX of the mandrel 40 extends. The to-be-wound fiber 32Y has a width reduced stepwise with increasing distance from the one end portion 321 and decreasing distance to the opposite end portion 322. The to-be-wound fiber 32Y includes a first-layer fiber 32Y1, a second-layer fiber 32Y2, a third-layer fiber 32Y3, and a fourth-layer fiber 32Y4 arranged in this order from the one end portion 321 toward the opposite end portion 322. Each of the fibers 32Y1 to 32Y4 has a rectangular shape in a plan view. The first-layer fiber 32Y1 has a width W1. The second-layer fiber 32Y2 has a width W2. The third-layer fiber 32Y3 has a width W3. The fourth-layer fiber 32Y4 has a width W4. The width of the to-be-wound fiber 32Y has the following relationship: width W1>width W2>width W3>width W4. The to-be-wound fiber 32Y is wound on the mandrel 40 in such a manner that the first-layer fiber 32Y1, the second-layer fiber 32Y2, the third-layer fiber 32Y3, and the fourth-layer fiber 32Y4 are stacked in this order from a position closer to the mandrel 40 (FIG. 5).

Step S102 and step S20 are executed by using a fiber winding machine 80 shown in FIG. 5. The fiber winding machine 80 includes the cylindrical bobbin 90 with the unformed fiber 32T wound on the bobbin 90, the roller 60 for forming the to-be-wound fiber 32Y while transferring the unformed fiber 32T, and the mandrel 40 on which the to-be-wound fiber 32Y is to be wound.

By the rotation of the bobbin 90, the unformed fiber 32T is fed toward the mandrel 40. The roller 60 is a drum-shaped roller. The roller 60 rotates in a direction indicated by an arrow Ra to transfer the to-be-wound fiber 32Y toward the mandrel 40. As shown in FIG. 6, the roller 60 rotates about a rotation axis AX. The roller 60 has an outer circumferential surface 61 having a cylindrical shape. The outer circumferential surface 61 is provided with the recess 62 formed to extend over a circumferential direction. The recess 62 has a width Wt reduced with decreasing distance to a bottom 63 defined at a deepest position. The width Wt of the recess 62 corresponds to a length in a direction in which the rotation axis AX extends. A plane 64 defining the width Wt of the recess 62 is a curved plane. The roller 60 is rotatably coupled to an actuator (not shown in the drawings) and is movable in a direction in which the unformed fiber 32T (to-be-wound fiber 32Y) is pressed downwardly (a direction indicated by an arrow D).

The mandrel 40 (FIG. 5) is made of metal such as stainless steel, iron, or copper, for example. The mandrel 40 has a columnar shape and has the outer circumferential surface 42 of a cylindrical shape. The mandrel 40 has a shape imitating the shape of the straight section 21 of the liner 20. The outer diameter of the mandrel 40 is slightly larger (by about 0.5 mm, for example) than the outer diameter of the straight section 21 of the liner 20. The length of the mandrel 40 along the center axis BX is larger than the length of the straight section 21 of the liner 20. In this embodiment, the mandrel 40 has higher rigidity than the liner 20. More specifically, compared to the rigidity of the liner 20, the rigidity of the mandrel 40 is increased by using the metal having higher Young's modulus than the liner 20 made of the resin.

In step S104, while the unformed fiber 32T (FIG. 4) is transferred sequentially toward the mandrel 40 in order from the first end portion 321T, the recess 62 of the roller 60 is pressed against the unformed fiber 32T, thereby forming the to-be-wound fiber 32Y. More specifically, the recess 62 is pressed against the unformed fiber 32T to arrange the unformed fiber 32T in such a manner that a part of the unformed fiber 32T to be wound on a position separated further from the outer circumferential surface 42 of the mandrel 40 (a position closer to an outer layer) is located at a position closer to the bottom 63 of the recess 62. In this embodiment, force in pressing the recess 62 against the unformed fiber 32T is increased at a part of the unformed fiber 32T to be wound on a position separated further from the outer circumferential surface 42 of the mandrel 40 (a position closer to the outer layer). In this way, the unformed fiber 32T is located at a position closer to the bottom 63 of the recess 62. Further, increasing force in pressing the unformed fiber 32T with the recess 62 increases tension applied to the unformed fiber 32T.

As shown in FIG. 6, for example, the first-layer fiber 32Y1 of the to-be-wound fiber 32Y to directly contact the outer circumferential surface 42 of the mandrel 40 is formed by pressing the to-be-wound fiber 32Y with the recess 62 so as to locate the first-layer fiber 32Y1 at a position farthest from the bottom 63 of the recess 62. As shown in FIG. 7, the second-layer fiber 32Y2 of the to-be-wound fiber 32Y to be wound on the first-layer fiber 32Y1 is formed by pressing the to-be-wound fiber 32Y with the recess 62 so as to locate the second-layer fiber 32Y2 at a position closer to the bottom 63 than the position for forming the first-layer fiber 32Y1. More specifically, the unformed fiber 32T is located at a position closer to the bottom 63 of the recess 62 than the position for forming the first-layer fiber 32Y1 (FIG. 8) by applying greater force Ft (FIG. 7) to the unformed fiber 32T than that applied for forming the first-layer fiber 32Y1. At this time, the second-layer fiber 32Y2 to be wound on the first-layer fiber 32Y1 receives tension greater than tension on the first-layer fiber 32Y1. By locating the unformed fiber 32Y at the position closer to the bottom 63, the width W2 of the second-layer fiber 32Y2 becomes smaller than the width W1 of the first-layer fiber 32Y1. In this way, the thickness of the second-layer fiber 32Y2 becomes larger than the thickness of the first-layer fiber 32Y1, as shown in FIG. 9. Likewise, for formation of the third-layer fiber 32Y3 of the to-be-wound fiber 32Y to be wound on the second-layer fiber 32Y2 and for formation of the fourth-layer fiber 32Y4 of the to-be-wound fiber 32Y to be wound on the third-layer fiber 32Y3, the unformed fiber 32T is located at a position closer to the bottom 63 by increasing force in pressing fiber to be wound on a position separated further from the outer circumferential surface 42 (a position closer to the outer layer) with the recess 62. By doing so, as shown in FIG. 4, the widths W1, W2, W3, and W4 of the to-be-wound fiber 32Y to be wound on the outer circumferential surface 42 of the mandrel 40 are reduced stepwise with increasing distance from the one end portion 321 and decreasing distance to the opposite end portion 322. Each of the lateral portions 324Y and 325Y of the to-be-wound fiber 32Y to be wound on the outer circumferential surface 42 of the mandrel 40 is located on an inner side in the width direction of the to-be-wound fiber 32Y at a position closer to the opposite end portion 322 than a position closer to the one end portion 321. The unformed fiber 32T is located at a position closer to the bottom 63 of the recess 62 by increasing force in pressing the unformed fiber 32T with the recess 62. A position of the unformed fiber 32T in the recess 62 may be changed by a method other than the method of changing the pressing force. For example, while the roller 60 is at a fixed position, the unformed fiber 32T may be depressed toward the bottom 63 from a position opposite the roller 60 or the unformed fiber 32T may be extracted toward a direction away from the bottom 63. In this way, a position of the unformed fiber 32T in the recess 62 may be changed.

The to-be-wound fiber 32Y prepared in step S10 is wound on the outer circumferential surface 42 of the mandrel 40 sequentially in the circumferential direction of the outer circumferential surface 42 in order from the one end portion 321 toward the opposite end portion 322 (step S20 of FIG. 2). The to-be-wound fiber 32Y is wound on the mandrel 40 in such a manner that the width direction of the to-be-wound fiber 32Y extends parallel to the center axis BX of the mandrel 40. In this way, multiple layers of the to-be-wound fiber 32Y are stacked on the outer circumferential surface 42 to form the uncured sheet layer 32V (step S20 of FIG. 2). In this embodiment, the uncured sheet layer 32V is formed by stacking four layers of the to-be-wound fiber 32Y on the outer circumferential surface 42.

As shown in FIG. 11, in the formation step corresponding to step S20, the to-be-wound fiber 32Y is wound on the outer circumferential surface 42 in such a manner that the length of the to-be-wound fiber 32Y in the axis direction LD (the widths W1 to W4 of the to-be-wound fiber 32Y) is reduced gradually with increasing distance from the first-layer fiber 32Y1 to form a bottom layer closer to the outer circumferential surface 42 and decreasing distance to the fourth-layer fiber 32Y4 to form a top layer. Each of the fibers from the first-layer fiber 32Y1 to the fourth-layer fiber 32Y4 to form a corresponding layer of the uncured sheet layer 32V has opposite end portions 324Y and 325Y in the axis direction LD. In the formation step corresponding to step S20, the to-be-wound fiber 32Y is wound on the outer circumferential surface 42 in such a manner that, regarding an outer layer and an inner layer adjacent to the outer layer in a stacking direction of the uncured sheet layer 32V and closer to the outer circumferential surface 42 than the outer layer, the two end portions 324Y and 325Y of the outer layer are located between the two end portions 324Y and 325Y of the inner layer in the axis direction LD. Specifically, the second-layer fiber 32Y2 is wound on the outer circumferential surface 42 in such a manner that opposite end portions 324Y2 and 325Y2 of the second-layer fiber 32Y2 as the outer layer are located between opposite end portions 324Y1 and 325Y1 of the first-layer fiber 32Y1 as the inner layer in the axis direction LD. Further, the third-layer fiber 32Y3 is wound on the outer circumferential surface 42 in such a manner that opposite end portions 324Y3 and 325Y3 of the third-layer fiber 32Y3 as the outer layer are located between the opposite end portions 324Y2 and 325Y2 of the second-layer fiber 32Y2 as the inner layer in the axis direction LD. Also, the fourth-layer fiber 32Y4 is wound on the outer circumferential surface 42 in such a manner that opposite end portions 324Y4 and 325Y4 of the fourth-layer fiber 32Y4 as the outer layer are located between the opposite end portions 324Y3 and 325Y3 of the third-layer fiber 32Y3 as the inner layer in the axis direction LD.

The opposite end portions 324Y and 325Y of the uncured sheet layer 32V are formed into shapes so as to substantially conform to the external surfaces of the dome sections 22 and 23 (FIG. 1). For example, a level difference K1 in the axis direction LD between the end portions 324Y of two layers adjacent to each other in the stacking direction and a level difference K2 in the axis direction LD between the end portions 325Y of these two layers are each preferably from 0.05 mm or more to 4 mm or less, more preferably, from 0.05 mm or more to 3 mm or less, still more preferably, from 0.05 mm or more to 2 mm or less. By reducing the level differences K1 and K2 within a range that makes the shapes of the opposite end portions 324Y and 325Y substantially conform to the external surfaces of the dome sections 22 and 23, reduction is allowed in the occurrence of meandering in a fiber bundle to be wound on a boundary between the sheet layer 32 and the liner 20. This makes it possible to reduce the likelihood of strength reduction of the reinforcement layer 30. Additionally, the uncured sheet layer 32V is increased in thickness with increasing distance from the first-layer fiber 32Y1 and decreasing distance to the fourth-layer fiber 32Y4.

As shown in FIG. 2, after execution of step S20, the uncured sheet layer 32V wound on the mandrel 40 is heated to cure the thermosetting resin, thereby forming the sheet layer 32 to constitute the reinforcement layer 30 (step S30). The sheet layer 32 differs from the uncured sheet layer 32V only in that the resin in the sheet layer 32 is cured. The sheet layer 32 is substantially the same as the uncured sheet layer 32V in terms of a shape, for example. More specifically, the sheet layer 32 is formed in such a manner that, regarding an outer layer and an inner layer adjacent to the outer layer in the stacking direction and closer to the outer circumferential surface 42 than the outer layer, two end portions of the outer layer are located between two end portions of the inner layer in the axis direction LD.

Figure 12:
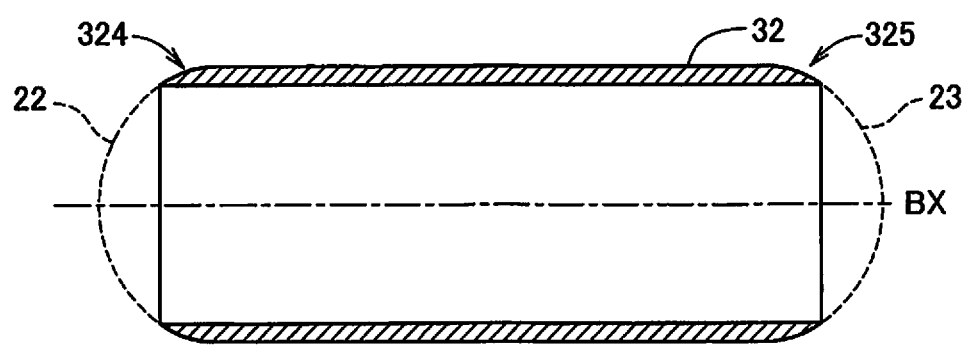
FIG. 12 is a sectional schematic view of a sheet layer after execution of step S40.

After formation of the sheet layer 32 is completed, a step of extracting the mandrel 40 from the sheet layer 32 is executed (step S40 of FIG. 2). FIG. 12 is a sectional schematic view of the sheet layer 32 after execution of step S40. Like the opposite end portions 324Y and 325Y of the uncured sheet layer 32V, each of the opposite end portions 324 and 325 of the sheet layer 32 is formed so as to get closer to an inner side stepwise in the axis direction LD with increasing distance from an inner layer and decreasing distance to an outer layer. Specifically, the shapes of the opposite end portions 324 and 325 of the sheet layer 32 substantially conform to the external surfaces of the dome sections 22 and 23. After execution of step S40, a step of fitting the liner 20 into the sheet layer 32 is executed (step S50 of FIG. 2).

Figure 13:
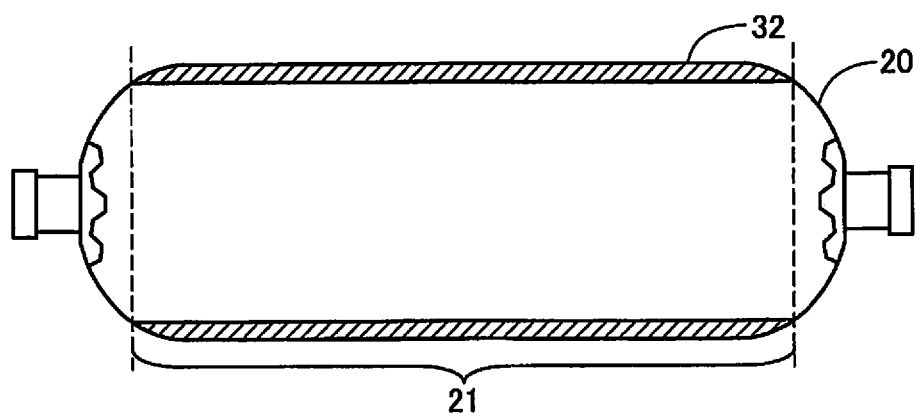
FIG. 13 is a schematic view showing a state where a liner is fitted into the sheet layer by execution of step S50.

FIG. 13 is a schematic view showing a state where the liner 20 is fitted into the sheet layer 32 by execution of step S50. In this embodiment, the sheet layer 32 is formed by using the mandrel 40 having an outer diameter slightly larger than that of the straight section 21 of the liner 20. This facilitates fitting of the liner 20 into the sheet layer 32. If the outer diameter of the straight section 21 of the liner 20 and the inner diameter of the sheet layer 32 are substantially the same, for example, the liner 20 may be shrunk by being cooled in advance. Then, the liner 20 may be inserted into the sheet layer 32.

After execution of step S50, a pressurization step is executed (step S60 of FIG. 2). In the pressurization step, pressure is applied to the inside of the liner 20 through the ferrule 13 to make the external surface of the straight section 21 of the liner 20 contact the inner surface of the sheet layer 32.

After execution of the pressurization step, a step of forming an uncured helical layer is executed by winding the fiber bundle on the liner 20 while the inside of the liner 20 is kept in a pressurized state (step S70). In step S70, the uncured helical layer is formed by winding the fiber bundle impregnated with the thermosetting resin by helical winding on the liner 20 by the FW process. In this helical winding, the fiber bundle is wound on a range including the dome sections 22 and 23 and the sheet layer 32 at a winding angle from zero to 30 degrees from the center axis of the liner 20. Specifically, in step S70, the fiber bundle is wound on the sheet layer 32 and on the dome sections 22 and 23 of the liner 20.

Figure 14:
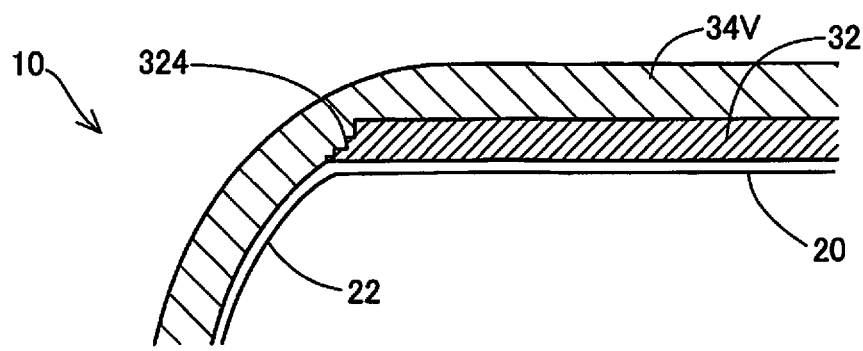
FIG. 14 is a schematic view showing a state where an uncured helical layer is formed by execution of step S70.

FIG. 14 is a schematic view showing a state where an uncured helical layer 34V is formed by execution of step S70. FIG. 14 shows the cross section of a part of the tank 10. In this embodiment, the sheet layer 32 is formed in such a manner that the shapes of the opposite end portions 324 and 325 of the sheet layer 32 substantially conform to the external surfaces of the dome sections 22 and 23. This makes it possible to reduce a level difference occurring at a boundary between the sheet layer 32 and the liner 20, thereby reducing the occurrence of meandering in the fiber bundle to constitute the helical layer 34. As a result, winding of the fiber bundle is allowed to proceed precisely even on the dome sections 22 and 23, making it possible to increase the strength of the tank 10 as a whole including the dome sections 22 and 23.

After execution of step S70, the uncured helical layer 34V is heated to cure the thermosetting resin, thereby forming the helical layer 34 (step S80 of FIG. 2). Step S30 may be omitted, and the uncured sheet layer 32V and the uncured helical layer 34V may be cured together in step S80. After execution of step S80, the liner 20 is released from the pressurized state (step S90). By following the series of steps described above, formation of the tank 10 is completed.

In the above-described first embodiment, in the formation step of forming the uncured sheet layer 32V, the to-be-wound fiber 32Y is wound on the outer circumferential surface 42 of the mandrel 40 in such a manner that the two end portions 324Y and 325Y of an outer layer are located between the two end portions 324Y and 325Y of an inner layer in the axis direction LD (FIG. 11). Thus, after the to-be-wound fiber 32Y is wound on the mandrel 40, there arises no need to execute a step of processing the to-be-wound fiber 32Y into a shape conforming to the external surfaces of the dome sections 22 and 23 of the liner 20. This makes it possible to reduce the likelihood of increasing time or cost for manufacturing the sheet layer 32. Further, the opposite end portions 324 and 325 (FIG. 12) are not required to be processed after formation of the sheet layer 32. This makes it possible to reduce the likelihood of cutting the resin and exposing the fiber to be caused by processing on the opposite end portions 324 and 325. In this way, the likelihood of strength reduction at the opposite end portions 324 and 325 is reduced.

The above-described first embodiment allows formation of the to-be-wound fiber 32Y easily by using the roller 60 with the recess 62 while the unformed fiber 32T is transferred toward the mandrel 40. This eliminates the need for processing the unformed fiber 32T in advance for forming the to-be-wound fiber 32Y, thereby enhancing efficiency in manufacturing the reinforcement layer 30.

In the above-described first embodiment, the step of forming the to-be-wound fiber 32Y (step S102 of FIG. 3) includes a step of increasing tension applied to a part (predetermined part) of the unformed fiber 32T to be wound on a position separated further from the outer circumferential surface 42 of the mandrel 40 by increasing force in pressing the recess 62 against the unformed fiber 32T at the predetermined part (FIGS. 5 and 6). This allows the to-be-wound fiber 32Y, to be wound on a position separated further from the outer circumferential surface 42, to receive greater tension. This makes it possible to reduce the likelihood that the tension on the wound fiber will be reduced with decreasing distance to an outer layer.

Figure 15:
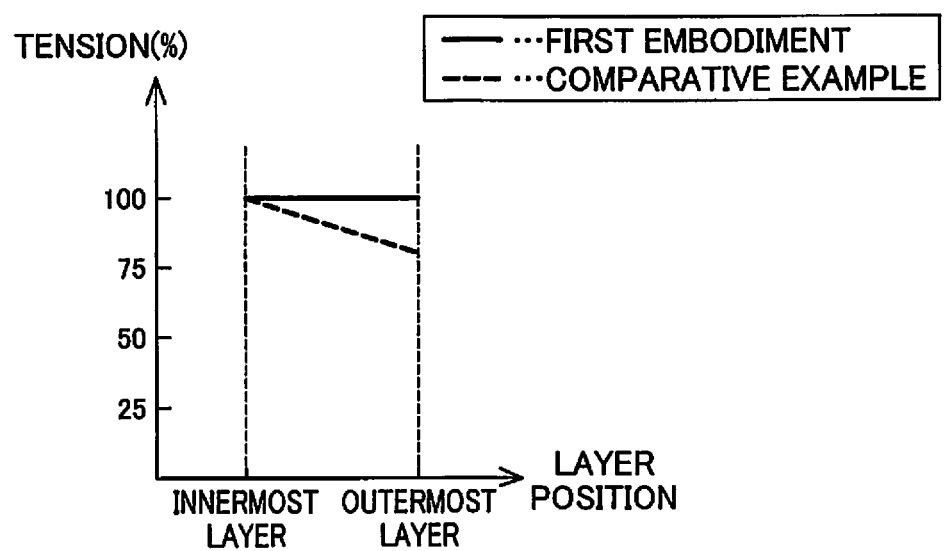
FIG. 15 is a view for explaining effect relating to tension achieved by the first embodiment.

FIG. 15 is a view for explaining effect relating to tension achieved by the first embodiment. If sheet-like fiber is wound on the mandrel 40 without using the roller 60, tension on the sheet-like fiber is generally reduced with increasing distance from an inner layer and decreasing distance to an outer layer. In the absence of the roller 60, tension applied to the sheet-like fiber is generated by a difference in rotation speed between the mandrel 40 and the bobbin 90 to rotate at their constant speeds. By contrast, in this embodiment, apart of the to-be-wound fiber 32Y to be wound on a position closer to the outer layer receives greater tension applied from the recess 62. This makes it possible to reduce the likelihood that, in the uncured sheet layer 32V after winding and the cured sheet layer 32, tension on the wound fiber will be reduced with decreasing distance to the outer layer away from the outer circumferential surface 42. As shown in FIG. 15, for example, the first embodiment allows application of uniform tension to all the layers from an innermost layer to an outermost layer in the uncured sheet layer 32V after winding and the cured sheet layer 32.

In the above-described first embodiment, the to-be-wound fiber 32Y is wound on the metallic mandrel 40 having higher rigidity than the resin liner 20. This makes it possible to form the sheet layer 32 by applying greater tension than that to be applied for winding the to-be-wound fiber 32Y on the liner 20. This allows reduction in the occurrence of distortion in the to-be-wound fiber 32Y. As a result, the tank 10 is allowed to have increased shape accuracy and increased strength.

B. Second Embodiment

Figure 16:
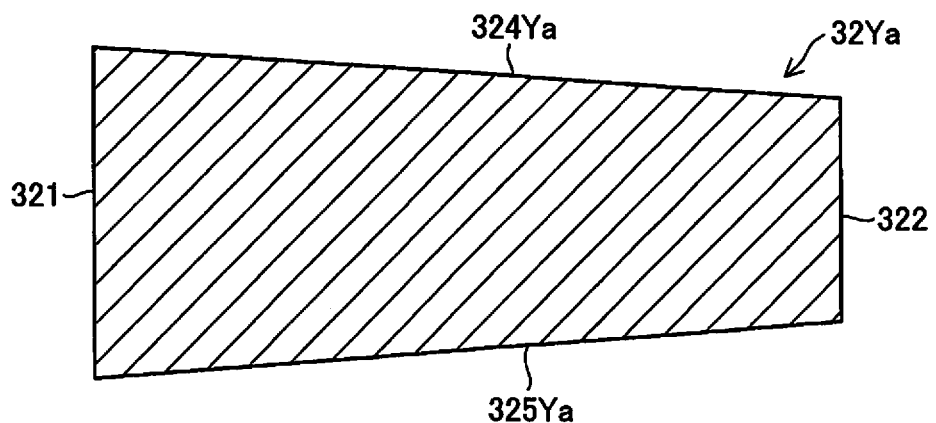
FIG. 16 is a view for explaining to-be-wound fiber of a second embodiment.
Figure 17:
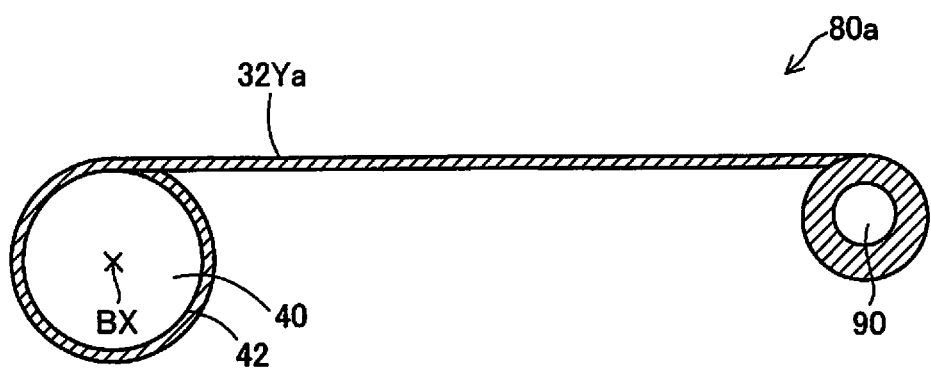
FIG. 17 is a view for explaining a fiber winding machine used in the second embodiment.

FIG. 16 is a view for explaining to-be-wound fiber 32Ya of a second embodiment. FIG. 17 is a view for explaining a fiber winding machine 80a used in the second embodiment. The second embodiment differs from the first embodiment mainly in a step of preparing the to-be-wound fiber 32Ya (step S10 of FIG. 2) and in the shape of the to-be-wound fiber 32Ya. In the second embodiment, the step of preparing the to-be-wound fiber 32Ya is a step of forming the to-be-wound fiber 32Ya in advance before the process in step S20 is started, specifically, before transfer of sheet-like fiber toward the mandrel 40 is started. Specifically, the fiber winding machine 80a of the second embodiment does not include the roller 60 (FIG. 5). Except for this point, the configuration of the fiber winding machine 80a is similar to that of the fiber winding machine 80 of the first embodiment. Thus, the similar configuration will be given the same sign as a corresponding configuration in the fiber winding machine 80 of the first embodiment. Where appropriate, description for such a similar configuration will be omitted.

Like the to-be-wound fiber of the first embodiment, the to-be-wound fiber 32Ya formed in advance (FIG. 16) is sheet-like fiber impregnated with thermosetting resin. The to-be-wound fiber 32Ya has one end portion 321, an opposite end portion 322 facing the one end portion 321, and two lateral portions 324Ya and 325Ya connecting the one end portion 321 and the opposite end portion 322. The to-be-wound fiber 32Ya has a width reduced continuously with increasing distance from the one end portion 321 and decreasing distance to the opposite end portion 322. Each of the lateral portions 324Ya and 325Ya of the to-be-wound fiber 32Ya is located on an inner side in the width direction of the to-be-wound fiber 32Ya at a position closer to the opposite end portion 322 than a position closer to the one end portion 321. More specifically, each of the lateral portions 324Ya and 325Ya of the to-be-wound fiber 32Ya gets closer to the inner side in the width direction with increasing distance from the one end portion 321 and decreasing distance to the opposite end portion 322. The to-be-wound fiber 32Ya has a uniform thickness. The to-be-wound fiber 32Ya is formed by cutting sheet-like fiber impregnated with the thermosetting resin (fiber before cutting). The fiber before cutting has a rectangular shape in a plan view, for example. Two lateral portions of the fiber before cutting is cut so as to reduce the width with increasing distance from the one end portion 321 and decreasing distance to the opposite end portion 322. In this way, the to-be-wound fiber 32Ya is formed easily. The to-be-wound fiber 32Ya may be formed by an alternative way of placing the fiber in a mold prepared in advance and then introducing the resin into the mold.

As shown in FIG. 17, the to-be-wound fiber 32Ya is wound sequentially on the mandrel 40 in order from the one end portion 321 toward the opposite end portion 322. The to-be-wound fiber 32Ya is wound on the mandrel 40 in such a manner that the width direction of the to-be-wound fiber 32Ya extends parallel to the center axis BX of the mandrel 40.

Figure 18:
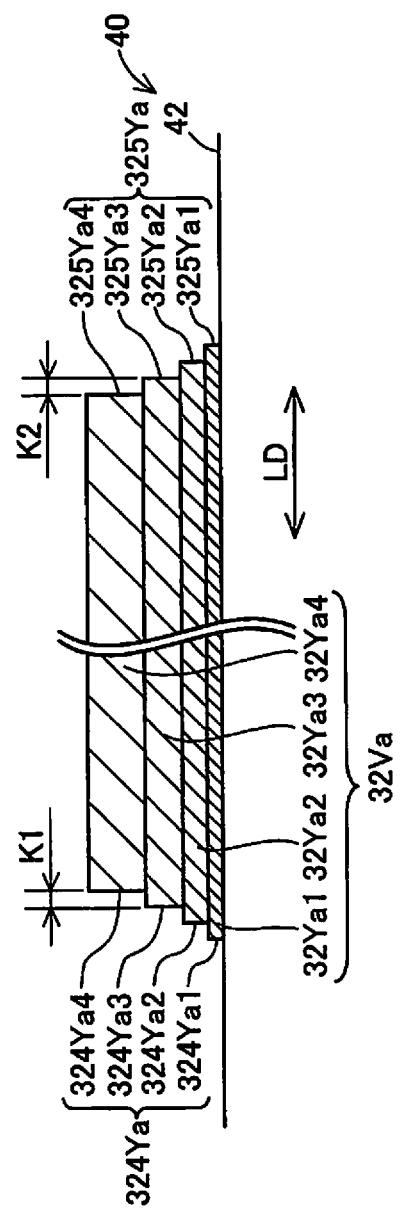
FIG. 18 is a sectional view showing an uncured sheet layer formed on the outer circumferential surface of the mandrel.

FIG. 18 is a sectional view showing an uncured sheet layer 32Ya formed on the outer circumferential surface 42 of the mandrel 40. FIG. 18 is a sectional view parallel to the center axis BX of the mandrel 40. The uncured sheet layer 32Va has four layers formed on the outer circumferential surface 42 of the mandrel 40. The uncured sheet layer 32Va includes a first-layer fiber 32Ya1, a second-layer fiber 32Ya2, a third-layer fiber 32Ya3, and a fourth-layer fiber 32Ya4 to form corresponding layers of the uncured sheet layer 32Va. Each of the fibers from the first-layer fiber 32Ya1 to the fourth-layer fiber 32Ya4 has opposite end portions 324Ya and 325Ya in the axis direction LD of the mandrel 40. Like in the first embodiment, in the formation step corresponding to step S20 of the second embodiment, the to-be-wound fiber 32Ya is wound on the outer circumferential surface 42 in the following ways regarding an outer layer and an inner layer adjacent to the outer layer in a stacking direction of the uncured sheet layer 32Va and closer to the outer circumferential surface 42 than the outer layer. The to-be-wound fiber 32Ya is wound on the outer circumferential surface 42 in such a manner that the opposite end portions 324Ya and 325Ya of the outer layer are located between the opposite end portions 324Ya and 325Ya of the inner layer in the axis direction LD. Specifically, the second-layer fiber 32Ya2 is wound on the outer circumferential surface 42 in such a manner that opposite end portions 324Ya2 and 325Ya2 of the second-layer fiber 32Y2$a$ as the outer layer are located between opposite end portions 324Ya1 and 325Ya1 of the first-layer fiber 32Ya1 as the inner layer in the axis direction LD. Further, the third-layer fiber 32Ya3 is wound on the outer circumferential surface 42 in such a manner that opposite end portions 324Ya3 and 325Ya3 of the third-layer fiber 32Ya3 as the outer layer are located between the opposite end portions 324Ya2 and 325Ya2 of the second-layer fiber 32Y2$a$ as the inner layer in the axis direction LD. Also, the fourth-layer fiber 32Ya4 is wound on the outer circumferential surface 42 in such a manner that opposite end portions 324Ya4 and 325Ya4 of the fourth-layer fiber 32Ya4 as the outer layer are located between the opposite end portions 324Ya3 and 325Ya3 of the third-layer fiber 32Ya3 as the inner layer in the axis direction LD. The opposite end portions 324Ya and 325Ya of the uncured sheet layer 32Va are formed into shapes so as to substantially conform to the external surfaces of the dome sections 22 and 23. For example, a level difference K1 in the axis direction LD between the end portions 324Ya of two layers adjacent to each other in the stacking direction and a level difference K2 in the axis direction LD between the end portions 325Ya of these two layers are each preferably from 0.05 mm or more to 4 mm or less, more preferably, from 0.05 mm or more to 3 mm or less, still more preferably, from 0.05 mm or more to 2 mm or less. By reducing the level differences K1 and K2 within a range that makes the shapes of the opposite end portions 324Ya and 325Ya substantially conform to the external surfaces of the dome sections 22 and 23, reduction is allowed in a level difference to occur at a boundary between the sheet layer 32 and the liner 20. This makes it possible to reduce the occurrence of meandering in a fiber bundle to constitute the helical layer 34. As a result, reduction is allowed in the likelihood of strength reduction of the reinforcement layer 30. After the uncured sheet layer 32Va is formed, the steps from step S30 to S90 (FIG. 2) are executed in the same manner as in the first embodiment, thereby manufacturing the tank 10.

The above-described second embodiment, which has the configuration similar to that of the first embodiment, achieves effect comparable to that achieved by the first embodiment. For example, in the second embodiment, after the to-be-wound fiber 32Ya is wound on the mandrel 40, there arises no need to execute a step of processing the to-be-wound fiber 32Ya into a shape conforming to the external surfaces of the dome sections 22 and 23 of the liner 20. This makes it possible to reduce the likelihood of increasing time or cost for manufacturing the sheet layer 32. Further, the above-described second embodiment allows preparation of the to-be-wound fiber 32Ya in advance before the step of forming the uncured sheet layer 32Va (step S20 of FIG. 2) is started. By preparing the to-be-wound fiber 32Ya in advance, tension to be applied during winding of the to-be-wound fiber 32Ya on the mandrel 40 is allowed to be set freely without restriction from the roller 60.

C. Modifications

The present disclosure is not limited to the above-described examples or embodiments but is feasible in the form of various aspects within a range not deviating from the substance of the disclosure. For example, the following modifications are applicable.

C-1. First Modification

In each of the above-described embodiments, the sheet layer 32 is formed by winding the to-be-wound fiber 32Y or 32Ya on the mandrel 40. However, a target for winding of the to-be-wound fiber 32Y or 32Ya is not limited to the mandrel 40. For example, the winding target member may be the liner 20. In this case, the sheet layer 32 is formed by winding the to-be-wound fiber 32Y or 32Ya on the straight section 21 of the liner 20. While the liner 20 of each of the above-described embodiments is made of resin, the liner 20 may also be made of metal.

C-2. Second Modification

Figure 19:
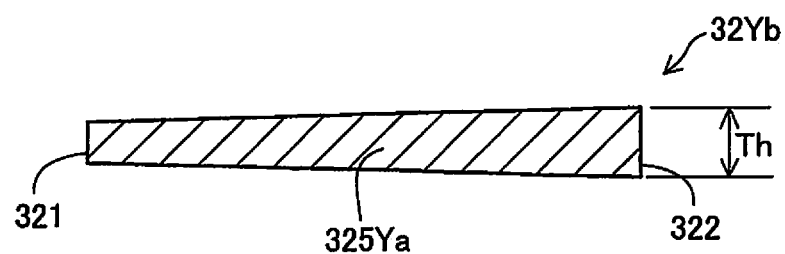
FIG. 19 is a schematic view for explaining to-be-wound fiber of a second modification.

In the second embodiment, the to-be-wound fiber 32Ya formed in advance has a uniform thickness. However, this is not the only case of the to-be-wound fiber 32Ya. FIG. 19 is a schematic view for explaining to-be-wound fiber 32Yb of a second modification. FIG. 19 is a schematic view of the to-be-wound fiber 32Yb from the lateral portion 325Ya. The to-be-wound fiber 32Yb prepared in advance has a thickness Th increased continuously with increasing distance from the one end portion 321 and decreasing distance to the opposite end portion 322. The to-be-wound fiber 32Yb has the same shape in a plan view as the to-be-wound fiber 32Ya shown in FIG. 16. For example, the to-be-wound fiber 32Yb may be formed by preparing a mold having a thickness increased with increasing distance from the one end portion 321 and decreasing distance to the opposite end portion 322, placing fiber in the mold, and then introducing resin into the mold. The to-be-wound fiber 32Yb is wound sequentially on the outer circumferential surface 42 of the mandrel 40 in order from the one end portion 321 toward the opposite end portion 322, thereby forming the sheet layer 32 increased in thickness with increasing distance from an innermost layer and decreasing distance to an outermost layer. By doing so, reduction in the mass and volume of the sheet layer 32 is suppressed even at a position closer to an outer layer of the sheet layer 32, making it possible to reduce the likelihood of strength reduction. The thickness Th of the to-be-wound fiber 32Yb prepared in advance may be increased stepwise with increasing distance from the one end portion 321 and decreasing distance to the opposite end portion 322. Specifically, the to-be-wound fiber 32Yb may be formed in advance in such a manner that the thickness of the to-be-wound fiber 32Yb is increased at a position closer to an outer layer when the sheet layer 32 is formed. By winding the to-be-wound fiber 32Yb sequentially on the outer circumferential surface 42 of the mandrel 40 in order from the one end portion 321 toward the opposite end portion 322, the thickness of the sheet layer 32 in a finished state is increased with increasing distance from the innermost layer and decreasing distance to the outermost layer.

C-3. Third Modification

Figure 20:
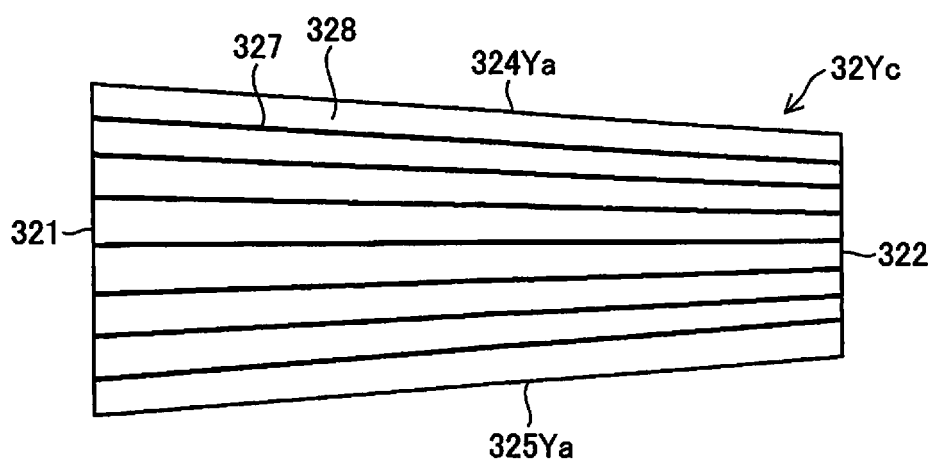
FIG. 20 is a schematic view for explaining to-be-wound fiber of a third modification.

FIG. 20 is a schematic view for explaining to-be-wound fiber 32Yc of a third modification. The to-be-wound fiber 32Yc prepared in advance may contain fiber 327 of a density (g/cm3) increased stepwise or continuously with increasing distance from the one end portion 321 and decreasing distance to the opposite end portion 322. The to-be-wound fiber 32Yc may be formed by arranging the fiber 327 more densely with increasing distance from the one end portion 321 and decreasing distance to the opposite end portion 322. Like the other to-be-wound fibers 32Y to 32Yb, the to-be-wound fiber 32Yc is impregnated with resin 328. The to-be-wound fiber 32Yc has a uniform thickness. Like the to-be-wound fiber 32Yb of the second modification, however, the thickness of the to-be-wound fiber 32Yc may be increased stepwise or continuously with increasing distance from the one end portion 321 and decreasing distance to the opposite end portion 322. The to-be-wound fiber 32Yc is wound sequentially on the outer circumferential surface 42 of the mandrel 40 in order from the one end portion 321 toward the opposite end portion 322, thereby forming the uncured sheet layer 32V and the sheet layer 32 increased in fiber density with increasing distance from an innermost layer and decreasing distance to an outermost layer. By doing so, reduction in the mass of the sheet layer 32 is suppressed even at a position closer to an outer layer of the sheet layer 32, making it possible to reduce the likelihood of strength reduction at the position closer to the outer layer.

C-4. Fourth Modification

Figure 21:
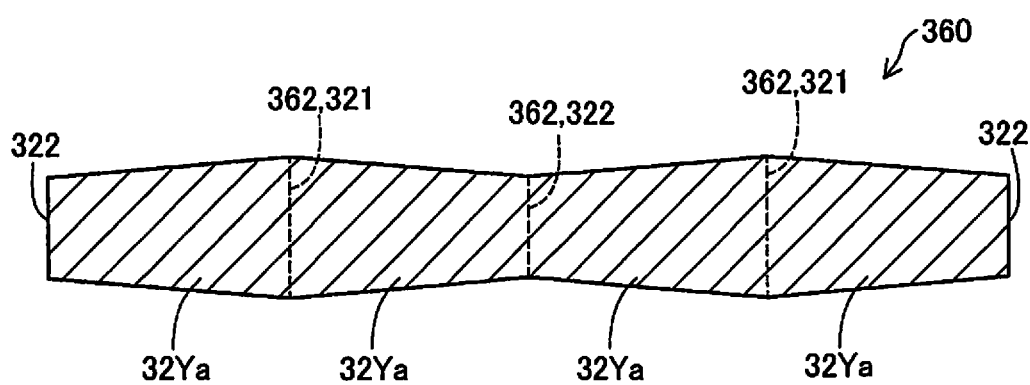
FIG. 21 is a schematic view showing sheet-like fiber as a basis of to-be-wound fiber.

FIG. 21 is a schematic view showing sheet-like fiber 360 as a basis of the to-be-wound fiber 32Ya. To prepare the to-be-wound fiber 32Ya in advance, the sheet-like fiber 360 including a sequence of multiple to-be-wound fibers 32Ya may be formed in advance. In the sheet-like fiber 360, adjacent to-be-wound fibers 32Ya are connected to each other at their opposite end portions 322 or at their one end portions 321. The to-be-wound fiber 32Ya is prepared by cutting the sheet-like fiber 360 at a portion corresponding to the one end portion 321 or the opposite end portion 322. In the fourth modification, forming the sheet-like fiber 360 in advance achieves increased productivity of the to-be-wound fiber 32Ya.

C-5. Fifth Modification

In step S104 of the above-described first embodiment, force in pressing the unformed fiber 32T with the recess 62 is increased at a part of the unformed fiber 32T to be wound on a position closer to an outer layer. However, pressing force applied to the unformed fiber 32T may be constant.

This disclosure is not limited to the above-described embodiments, examples, or modifications but is feasible in the form of various configurations within a range not deviating from the substance of the disclosure. Unless being described as absolute necessities in this specification, technical features of this disclosure may be deleted, where appropriate. For example, this disclosure is feasible in the form of the following aspects.

(1) According to one aspect of this disclosure, a method of manufacturing a reinforcement layer made of fiber-reinforced resin is provided. The reinforcement layer is arranged around a liner forming a body of a tank. The method of manufacturing the reinforcement layer comprises: a preparatory step of preparing to-be-wound fiber as sheet-like fiber impregnated with resin and having one end portion, an opposite end portion, and two lateral portions connecting the one end portion and the opposite end portion, the to-be-wound fiber having a width reduced stepwise or continuously with increasing distance from the one end portion and decreasing distance to the opposite end portion, each of the two lateral portions being located on an inner side in a width direction of the to-be-wound fiber at a position closer to the opposite end portion than a position closer to the one end portion; and a formation step of forming an uncured sheet layer including multiple layers of the to-be-wound fiber stacked on an outer circumferential surface having a cylindrical shape of a winding target member by winding the to-be-wound fiber sequentially in a circumferential direction of the outer circumferential surface in order from the one end portion toward the opposite end portion. In the formation step, the to-be-wound fiber is wound on the outer circumferential surface in such a manner that, regarding an outer layer of the uncured sheet layer and an inner layer of the uncured sheet layer closer to the outer circumferential surface than the outer layer and adjacent to the outer layer in a stacking direction of the to-be-wound fiber, two end portions of the outer layer are located between two end portions of the inner layer in an axis direction extending along a center axis of the winding target member. According to this aspect, the to-be-wound fiber is wound on the outer circumferential surface in such a manner that the two end portions of the outer layer are located between the two end portions of the inner layer in the axis direction. Thus, after the to-be-wound fiber is wound on the winding target member, there arises no need to execute a step of processing the to-be-wound fiber into a shape conforming to an external surface of the liner.

(2) In the above-described aspect, the preparatory step may comprise: a step of preparing unformed fiber as sheet-like fiber impregnated with the resin and having a first end portion corresponding to the one end portion and a second end portion corresponding to the opposite end portion; and a step of forming the to-be-wound fiber by pressing a recess of a roller against the unformed fiber while transferring the unformed fiber sequentially in order from the first end portion toward the winding target member, the recess having a width reduced with decreasing distance to a bottom of the recess. In the step of forming the to-be-wound fiber, the recess may be pressed against the unformed fiber in such a manner that a part of the unformed fiber to be wound on a position separated further from the outer circumferential surface is located at a position closer to the bottom. This aspect allows formation of the to-be-wound fiber easily by using the roller with the recess while the unformed fiber is transferred toward the winding target member. This eliminates the need for processing the unformed fiber in advance for forming the to-be-wound fiber, thereby enhancing efficiency in manufacturing the reinforcement layer.

(3) In the above-described aspect, the step of forming the to-be-wound fiber may comprise a step of increasing tension applied to a part of the unformed fiber to be wound on a position separated further from the outer circumferential surface by increasing force in pressing the unformed fiber with the recess at this part. This aspect allows fiber, to be wound on a position separated further from the outer circumferential surface, to receive greater tension. This makes it possible to reduce the likelihood that the tension on the wound fiber will be reduced with decreasing distance to an outer layer away from the outer circumferential surface.

(4) In the above-described aspect, the preparatory step may be a step of forming the to-be-wound fiber in advance before the formation step is started. This aspect allows preparation of the to-be-wound fiber in advance before the formation step is started.

(5) In the above-described aspect, the preparatory step may be a step of forming the to-be-wound fiber in advance by cutting sheet-like fiber. In this aspect, the to-be-wound fiber is formed easily by cutting the sheet-like fiber.

(6) In the above-described aspect, the to-be-wound fiber formed in advance in the preparatory step may have a fiber density increased stepwise or continuously with increasing distance from the one end portion and decreasing distance to the opposite end portion. This aspect allows increase in the fiber density in the uncured sheet layer with increasing distance from an innermost layer and decreasing distance to an outermost layer. By doing so, reduction in the mass of a sheet layer formed by curing the uncured sheet layer is suppressed at a position closer to an outer layer of the sheet layer, making it possible to reduce the likelihood of strength reduction at the position closer to the outer layer.

(7) In the above-described aspect, the to-be-wound fiber formed in advance in the preparatory step may have a thickness increased stepwise or continuously with increasing distance from the one end portion and decreasing distance to the opposite end portion. This aspect allows increase in the thickness of the uncured sheet layer with increasing distance from an innermost layer and decreasing distance to an outermost layer. By doing so, reduction in the mass and volume of a sheet layer formed by curing the uncured sheet layer is suppressed at a position closer to an outer layer of the sheet layer, making it possible to reduce the likelihood of strength reduction at the position closer to the outer layer.

This disclosure is feasible in the form of various aspects other than the above-described method of manufacturing the reinforcement layer. For example, this disclosure is feasible as a method of manufacturing a tank with a reinforcement layer, as a device for manufacturing a reinforcement layer, or as a device for manufacturing a tank, for example.

What is claimed is:

1. A method of manufacturing a reinforcement layer made of fiber-reinforced resin and arranged around a liner forming a body of a tank, the method comprising:
    a preparatory step of preparing to-be-wound fiber as sheet-like fiber impregnated with resin and having one end portion, an opposite end portion, and two lateral portions connecting the one end portion and the opposite end portion, the to-be-wound fiber having a width reduced stepwise or continuously with increasing distance from the one end portion and decreasing distance to the opposite end portion such that the two lateral portions are closer to one another in a width direction of the to-be-wound fiber at a first position closer to the opposite end portion than a second position closer to the one end portion; and
    a formation step of forming an uncured sheet layer including multiple layers of the to-be-wound fiber stacked on an outer circumferential surface having a cylindrical shape of a winding target member by winding the to-be-wound fiber sequentially in a circumferential direction of the outer circumferential surface in order from the one end portion toward the opposite end portion, wherein
    in the formation step, the to-be-wound fiber is wound on the outer circumferential surface in such a manner that, regarding an outer layer of the uncured sheet layer and an inner layer of the uncured sheet layer closer to the outer circumferential surface than the outer layer and adjacent to the outer layer in a stacking direction of the to-be-wound fiber, two lateral portions of the outer layer are located between two lateral portions of the inner layer in an axis direction extending along a center axis of the winding target member.

2. The method of manufacturing the reinforcement layer in accordance with claim 1, wherein
    the preparatory step comprises:
    a step of preparing unformed fiber as sheet-like fiber impregnated with the resin and having a first end portion corresponding to the one end portion and a second end portion corresponding to the opposite end portion; and
    a step of forming the to-be-wound fiber by pressing a recess of a roller against the unformed fiber while transferring the unformed fiber sequentially in order from the first end portion toward the winding target member, the recess having a width reduced with decreasing distance to a bottom of the recess, and
    in the step of forming the to-be-wound fiber, the unformed fiber is pressed with the recess in such a manner that a part of the unformed fiber to be wound on a position separated further from the outer circumferential surface is located at a position closer to the bottom.

3. The method of manufacturing the reinforcement layer in accordance with claim 2, wherein
    the step of forming the to-be-wound fiber comprises a step of increasing tension applied to a part of the unformed fiber to be wound on a position separated further from the outer circumferential surface by increasing force in pressing the unformed fiber with the recess at this part.

4. The method of manufacturing the reinforcement layer in accordance with claim 1, wherein
    the preparatory step is a step of forming the to-be-wound fiber in advance before the formation step is started.

5. The method of manufacturing the reinforcement layer in accordance with claim 4, wherein
    the preparatory step is a step of forming the to-be-wound fiber in advance by cutting sheet-like fiber.

6. The method of manufacturing the reinforcement layer in accordance with claim 4, wherein
    the to-be-wound fiber formed in advance in the preparatory step has a fiber density increased stepwise or continuously with increasing distance from the one end portion and decreasing distance to the opposite end portion.

7. The method of manufacturing the reinforcement layer in accordance with claim 4, wherein the to-be-wound fiber formed in advance in the preparatory step has a thickness increased stepwise or continuously with increasing distance from the one end portion and decreasing distance to the opposite end portion.

* * * * *